(12) United States Patent
Zhang et al.

(10) Patent No.: US 12,364,578 B2
(45) Date of Patent: Jul. 22, 2025

(54) LOCKABLE ORTHODONTIC APPLIANCE

(71) Applicant: GUANGZHOU OO MEDICAL SCIENTIFIC LIMITED, Guangdong (CN)

(72) Inventors: Qinhui Zhang, Guangdong (CN); Zien Xu, Guangdong (CN); Li Ji, Guangdong (CN)

(73) Assignee: GUANGZHOU OO MEDICAL SCIENTIFIC LIMITED, Guangdong (CN)

( * ) Notice: Subject to any disclaimer, the term of this patent is extended or adjusted under 35 U.S.C. 154(b) by 384 days.

(21) Appl. No.: 18/009,334

(22) PCT Filed: Jul. 1, 2021

(86) PCT No.: PCT/CN2021/103969
§ 371 (c)(1),
(2) Date: Dec. 9, 2022

(87) PCT Pub. No.: WO2022/002191
PCT Pub. Date: Jan. 6, 2022

(65) Prior Publication Data
US 2023/0320820 A1    Oct. 12, 2023

(30) Foreign Application Priority Data
Jul. 3, 2020    (CN) .......................... 202010629234.8

(51) Int. Cl.
*A61C 7/28*    (2006.01)

(52) U.S. Cl.
CPC .................. *A61C 7/282* (2013.01)

(58) Field of Classification Search
CPC .... A61C 7/14; A61C 7/22; A61C 7/28; A61C 7/285; A61C 7/287
See application file for complete search history.

(56) References Cited

U.S. PATENT DOCUMENTS

| 4,103,423 A * | 8/1978 | Kessel | .................... | A61C 7/285 |
| | | | | 433/10 |
| 5,890,893 A * | 4/1999 | Heiser | .................... | A61C 7/287 |
| | | | | 433/14 |

(Continued)

FOREIGN PATENT DOCUMENTS

| CN | 103027755 | 4/2013 |
| CN | 105852994 | 8/2016 |

(Continued)

OTHER PUBLICATIONS

"International Search Report (Form PCT/ISA/210) of PCT/CN2021/103969," mailed on Sep. 28, 2021, with English translation thereof, pp. 1-4.

(Continued)

Primary Examiner — Ralph A Lewis
(74) Attorney, Agent, or Firm — JCIPRNET (57) ABSTRACT

A lockable orthodontic appliance, comprising a main body. An arch wire groove is formed on the main body, the main body is provided with a movable accessory, the accessory comprises a traction portion and a space occupying portion, the accessory can move between an available position and an unavailable position, and during the movement, the traction portion can drive the space occupying portion to enter the arch wire groove; or a traction member and a space occupying member are provided on the main body, the traction member can move, and during the movement, the traction member drives the space occupying member to enter the arch wire groove. The orthodontic appliance may have a plurality of states, the first is a locked state, the second is a traction state, the third is a traction locked state, and the fourth is a non-locked and non-traction state.

11 Claims, 11 Drawing Sheets

(56) References Cited

U.S. PATENT DOCUMENTS

| | | | | |
|---|---|---|---|---|
| 5,954,502 | A | * | 9/1999 | Tuenge .................... A61C 7/14 433/18 |
| 10,398,531 | B2 | * | 9/2019 | Ji ............................. A61C 7/22 |
| 2012/0315595 | A1 | * | 12/2012 | Beaudoin ............... A61C 7/287 29/896.11 |
| 2015/0182307 | A1 | * | 7/2015 | Yick ...................... A61C 7/125 433/24 |
| 2023/0320820 | A1 | * | 10/2023 | Zhang ..................... A61C 7/14 433/17 |
| 2025/0017700 | A1 | * | 1/2025 | Xu .......................... A61C 7/28 |
| 2025/0032224 | A1 | * | 1/2025 | Xu .......................... A61C 7/34 |

FOREIGN PATENT DOCUMENTS

| | | |
|---|---|---|
| CN | 107714206 | 2/2018 |
| CN | 209018994 | 6/2019 |
| CN | 110584810 | 12/2019 |
| CN | 213156610 | 5/2021 |
| KR | 20160049609 | 5/2016 |

OTHER PUBLICATIONS

"Written Opinion of the International Searching Authority (Form PCT/ISA/237) of PCT/CN2021/103969," mailed on Sep. 28, 2021, pp. 1-4.

* cited by examiner

LOCKABLE ORTHODONTIC APPLIANCE

CROSS-REFERENCE TO RELATED APPLICATION

This application is a 371 of international application of PCT application serial no. PCT/CN2021/103969, filed on Jul. 1, 2021, which claims the priority benefit of China application no. 202010629234.8, filed on Jul. 3, 2020. The entirety of each of the above-mentioned patent applications is hereby incorporated by reference herein and made a part of this specification.

BACKGROUND

Technical Field

The disclosure relates to the technical field of orthodontic appliances, and in particular, to a lockable orthodontic appliance.

Description of Related Art

At present, the most commonly used orthodontic appliances are bracket-type orthodontic appliances. By sticking brackets and buccal tubes provided with arch wire grooves on the patient's teeth, the arch wire is fixed so that the data of the arch wire can be expressed. Throughout the orthodontic process, the arch wire will be replaced with the progress of the treatment, usually from a small-sized arch wire to a large-sized arch wire. The sizes of the arch wire grooves on the bracket and on the buccal tube are fixed, and the sizes of the arch wire grooves are larger than the size of the largest arc wire. This makes the arch wire movable in the arch wire grooves, so that the torque and data of the arch wire cannot be accurately expressed. In order to allow the torque and data to be effectively expressed, a locking structure is required to be provided to press against the arch wire tightly so that the arch wire cannot move in the arch wire grooves.

The Applicant's prior patent application CN110584810A discloses a buccal tube with a movable or rotatable traction hook. The disclosure aims to provide an optimized solution in which a traction member is used to guide a space occupying member to press against an arch wire.

SUMMARY

In view of the above technical problems, the disclosure provides a lockable orthodontic appliance.

The technical solutions adopted by the disclosure to solve the technical problem include the following.

The disclosure provides an orthodontic appliance including a main body on which an arch wire groove is formed. The main body is provided with a movable accessory. The accessory includes a traction portion and a space occupying portion connected to each other, and the traction portion is able to move between an available position and an unavailable position. When the traction portion is in the available position, the traction portion is available for traction. When the traction portion is in the unavailable position, the traction portion is unavailable for traction. The traction portion is able to drive the space occupying portion to enter the arch wire groove when moving. When the traction portion is located in the available position, one end of the traction portion protrudes out of the main body, and the traction portion can be used to hang a traction tool such as a rubber band and steel wires. When the traction portion is in the unavailable position, the traction portion cannot be used to hang a traction tool such as a rubber band and steel wires. The available position of the traction portion may be one or more than one. When the space occupying portion enters the arch wire groove, it may only occupy part of the volume of the arch wire groove without contacting an arch wire. In this way, the clearance in the arch wire groove can be reduced, which is helpful for the data expression of the arch wire. The space occupying portion can also be in contact with the arch wire and press against the arch wire to lock the arch wire, so that the data of the arch wire can be fully expressed. It may be that when the traction portion is in the available position, the space occupying portion enters the arch wire groove, or when the traction portion is in the unavailable position, the space occupying portion enters the arch wire groove, both fall within the protection scope of the disclosure. The traction portion is equivalent to controlling the space occupying portion, and by moving the traction portion to a certain position, the space occupying portion is driven to occupy the space or lock the arch wire. That is, the accessory can perform both traction and occupancy locking functions, or only the traction function, or only the occupancy locking function.

In some preferred embodiments, the traction portion is able to drive the space occupying portion to move out of the arch wire groove when moving. The traction portion can further drive the space occupying portion to move out of the arch wire groove. In some preferred embodiments, the traction portion always drives the space occupying portion to enter and to move out of the arch wire groove when moving.

In some preferred embodiments, the space occupying portion is an elastic portion, so that the space occupying portion is able to press against different sizes of arch wires.

In some preferred embodiments, a connection between the main body and the accessory comprises a plurality of gear positions between which the accessory is able to be switched. When the accessory is located in a first gear position, the space occupying portion is located outside the arch wire groove. When the accessory is located in a second gear position, the space occupying portion partially enters the arch wire groove. When the accessory is located in the third gear position, a larger portion of the space occupying portion enters the arch wire groove than when the accessory is in the second gear position. When the accessory is in the first gear position, the traction portion may be in the available position or may be in the unavailable position. When the accessory is in the second gear position, the traction portion may be in the available position or may be in the unavailable position. When the accessory is in the third gear position, the traction portion may be in the available position or the unavailable position. That is, the accessory can perform both traction and occupancy locking functions, or only the traction function, or only the occupancy locking function.

In some preferred embodiments, the accessory is movable or rotatable relative to the main body, and the accessory is moved or rotated between the available position and the unavailable position.

The disclosure provides an orthodontic appliance including a main body on which an arch wire groove is formed. The main body is provided with a movable traction member and a space occupying member, and the traction member is able to move between an available position and an unavailable position. When the traction member is in the available position, the traction member is available for traction. When the traction member is in the unavailable position, the traction member is unavailable for traction. The traction member drives the space occupying member to enter the arch wire groove when moving. The traction member is movable or rotatable relative to the main body, and the space occupying member is movable or rotatable relative to the main body. When the space occupying member enters the arch wire groove, it may only occupy part of the volume of the arch wire groove without contacting the arch wire. In this way, the clearance in the arch wire groove can be reduced, which is helpful for the data expression of the arch wire. The space occupying member can also be in contact with the arch wire and press against the arch wire to lock the arch wire, so that the data of the arch wire can be fully expressed. It may be that when the traction member is in the available position, the space occupying member enters the arch wire groove, or when the traction member is in the unavailable position, the space occupying member enters the arch wire groove, both fall within the protection scope of the disclosure. The traction member is equivalent to controlling the space occupying member, and by moving the traction member to a certain position, the space occupying member is driven to occupy the space or lock the arch wire.

In some preferred embodiments, the traction member drives the space occupying member to move out of the arch wire groove when moving. When the arch wire is required to be adjusted or a tooth position no longer needs to be locked, the traction member can be moved, and the space occupying member is then driven to release the locking of the arch wire.

In some preferred embodiments, the orthodontic appliance further includes a transmission member, the traction member is in contact with the transmission member, and the traction member drives the space occupying member to move through the transmission member. The traction member may directly drive the space occupying member to move or may indirectly drive the space occupying member to move through the transmission member.

In a further preferred embodiment, the transmission member is an elastic member, so that the space occupying member is able to press against different sizes of arch wires. The elastic transmission member enables the depth of the space occupying member to enter the arch wire groove to be adjustable. When the traction member is moved to the available position and when the transmission member is in an initial state, the space occupying member can press against a small-sized arch wire. When the transmission member is squeezed and deformed, the space occupying member can press against a large-sized arch wire. That is, when the large-sized arch wire is placed into the arch wire groove, the space occupying member pushes the transmission member to deform when pressing against the arch wire.

In some preferred embodiments, the traction member is rotatably connected to the main body through a shaft, and the traction member and the transmission member are linked with each other by tooth meshing. When driving is performed through tooth meshing, the driving is relatively stable, and the position of the space occupying member can be well controlled after the traction member is moved.

In a further preferred embodiment, an end of the traction member connected to the main body is provided with teeth, and an end of the transmission member in contact with the traction member is provided with teeth.

In a further preferred embodiment, a limiting member is provided on the traction member, and the traction member prevents continuous movement of the transmission member from occurring when moving to the unavailable position. In this way, the transmission member can be prevented from falling when the traction member moves to the unavailable position.

In some preferred embodiments, a protrusion is provided on the traction member, and the protrusion pushes the transmission member and then pushes the space occupying member to move when the traction member moves from the unavailable position to the available position.

In some preferred embodiments, the orthodontic appliance further includes a reset member connected to the space occupying member, and the space occupying member is located outside the arch wire groove when the reset member is in an initial state. When the traction member drives the space occupying member to enter the arch wire groove, the reset member is squeezed and deformed. When the reset member is restored to its original shape, the space occupying member is driven to automatically move out of the arch wire groove.

In some preferred embodiments, a bottom portion of the arch wire groove is provided with a groove, and the reset member is provided in the groove. Further, an upper surface of the reset member is flush with the bottom portion of the arch wire groove, and placement of the arch wire into the arch wire groove is thus not affected. When the reset member enables the traction member to move to the unavailable position, the space occupying member can automatically exit the arch wire groove.

In some preferred embodiments, the space occupying member has a locking wall which is parallel to a side wall of the arch wire groove. The space occupying member presses against the arch wire through the locking wall to achieve locking of the arch wire.

Compared to the related art, the effects of the disclosure include the following. The orthodontic appliance provided by the disclosure includes a main body on which a movable accessory is provided. The accessory includes a traction portion and a space occupying portion, and the accessory is able to move between an available position and an unavailable position. The traction portion is able to drive the space occupying portion to enter the arch wire groove when moving. Alternatively, the main body is provided with a traction member and a space occupying member, and the traction member can move and drive the space occupying member to enter the arch wire groove when moving. The traction member can be moved to the available position when in use and can be moved to the unavailable position when not in use, so the traction member is prevented from stimulating the oral mucosa of the patient when not in use. Further, the traction member can drive the space occupying member to lock the arch wire. The orthodontic appliance provided by the disclosure has a plurality of states. The first is a locked state, where the space occupying portion or the space occupying member enters the arch wire groove to lock the arch wire. The second is a traction state, in which the traction member or the traction portion is moved to the available position, and the space occupying portion or the space occupying member is located outside the arch wire groove. The third is a traction locked state, in which the space occupying member or the space occupying portion enters the arch wire groove to occupy a certain space or to press against the arch wire to lock the arch wire, and the outer end of the traction member or the traction portion is available for traction. When the active bracket is used, because the active bracket does not move relative to the arch wire and has a traction member or a traction portion, the active bracket can pull other brackets and drive other teeth to move towards it. The fourth is a non-locked and non-traction state, in which the traction member or the traction portion is moved to the unavailable state, and the space occupying member or the space occupying portion exits the arch wire groove. When used as a simple bracket, the orthodontist will continuously make adjustment according to the process during the orthodontic treatment. The patented product can meet the needs of the orthodontist at various stages of treatment.

The disclosure is further described in detail in combination with accompanying figures and embodiments.

DESCRIPTION OF THE EMBODIMENTS

Embodiment 1

With reference to FIGS. 1 to 4, an orthodontic appliance including a main body 10 is provided in this embodiment, and an arch wire groove 11 is formed on the main body 10. The main body 10 is provided with a movable traction member 20 and a space occupying member 30, and the traction member 20 can move between an available position and an unavailable position. When the traction member 20 is in the available position, the traction member 20 is available for traction. When the traction member 20 is in the unavailable position, the traction member 20 is unavailable for traction. When moving from the unavailable position to the available position, the traction member 20 drives the space occupying member 30 to move to enter the arch wire groove 11. The traction member 20 can move, and the specific movement mode of the traction member may be movement, rotation, or a combination of movement and rotation. When needed, the traction member 20 may be moved to the available position, and the space occupying member 30 may be driven to enter the arch wire groove 11 to press against an arch wire.

During the movement of the traction member 20 from the available position to the unavailable position, the space occupying member 30 is driven by the traction member 20 to move out of the arch wire groove 11. When the arch wire is required to be adjusted or a tooth position no longer needs to be pulled and locked, the traction member 20 can be moved to the unavailable position, and the space occupying member 30 is then driven to release the locking of the arch wire.

The orthodontic appliance further includes a transmission member 50, the traction member 20 is in contact with the transmission member 50, and the traction member 20 drives the space occupying member 30 to move through the transmission member 50. The traction member 20 may directly drive the space occupying member 30 to move or may indirectly drive the space occupying member to move through the transmission member 50. The transmission member 50 is an elastic member, the part where the transmission member 50 is connected to the space occupying member 30 is U-shaped, and the space occupying member is provided with a sliding groove. Both ends of the U-shaped portion can slide along the sliding groove, so that the space occupying member 30 can press against different sizes of arch wires. The elastic transmission member 50 enables the depth of the space occupying member 30 to enter the arch wire groove 11 to be adjustable. When the traction member 20 is moved to the available position and when the transmission member 50 is in an initial state, the space occupying member 30 can press against a small-sized arch wire. When the transmission member 50 is squeezed and deformed, the space occupying member 30 can press against a large-sized arch wire. That is, when the large-sized arch wire is placed into the arch wire groove 11, the space occupying member 30 pushes the transmission member 50 to deform when pressing against the arch wire.

The traction member 20 is rotatably connected to the main body 10 through a shaft, and the traction member 20 and the transmission member 50 drive the space occupying member 30 to move by means of tooth meshing. By means of gear transmission, the transmission is relatively stable, and the position of the space occupying member 30 can be well controlled after the traction member 20 is moved.

A limiting member 21 is provided on the traction member 20, and the traction member 20 restricts continuous movement of the transmission member 50 when moving to the unavailable position.

Embodiment 2

Figure 1:
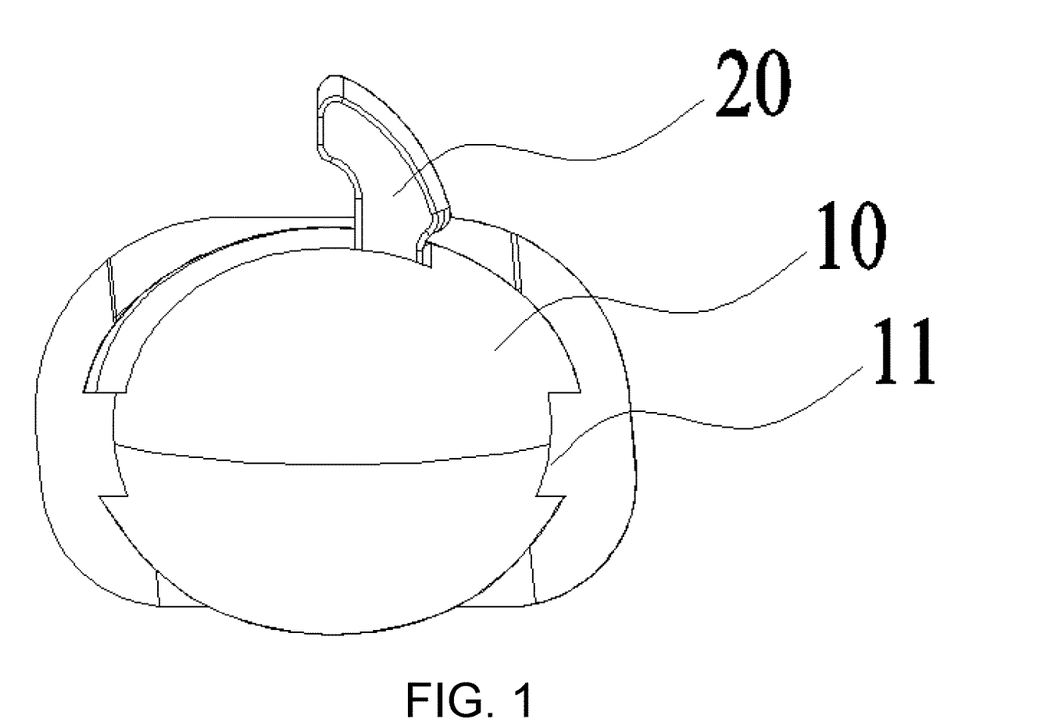
FIG. 1 is a schematic view of a structure of an orthodontic appliance in a first state according to embodiment 1.
Figure 2:
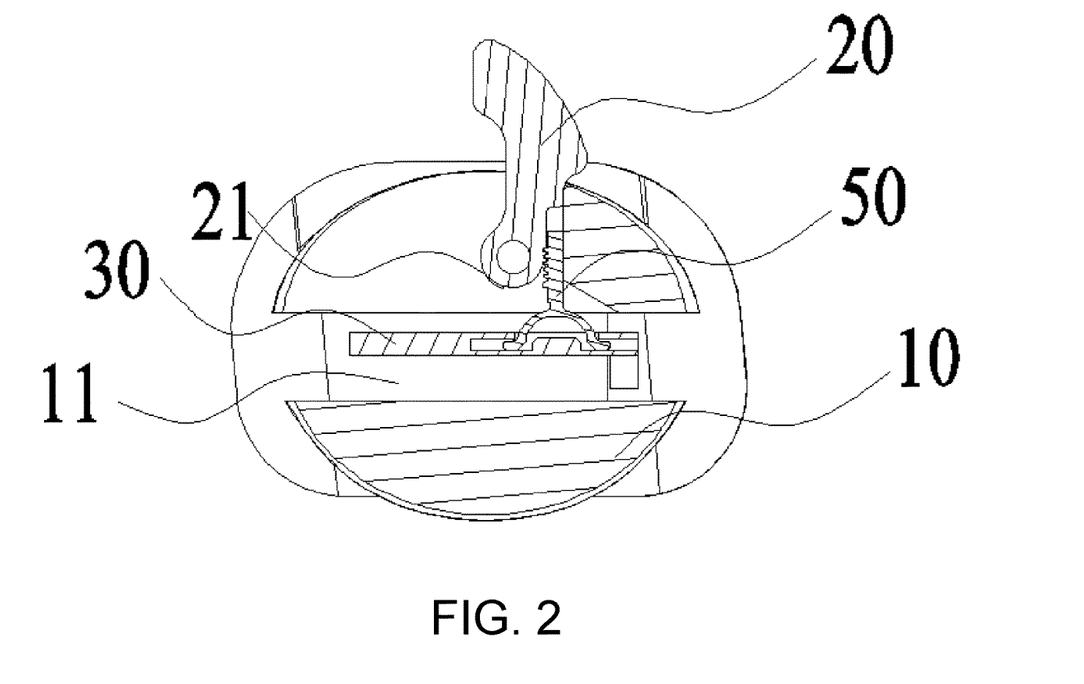
FIG. 2 is a cross-sectional view of the orthodontic appliance in the first state according to embodiment 1.
Figure 3:
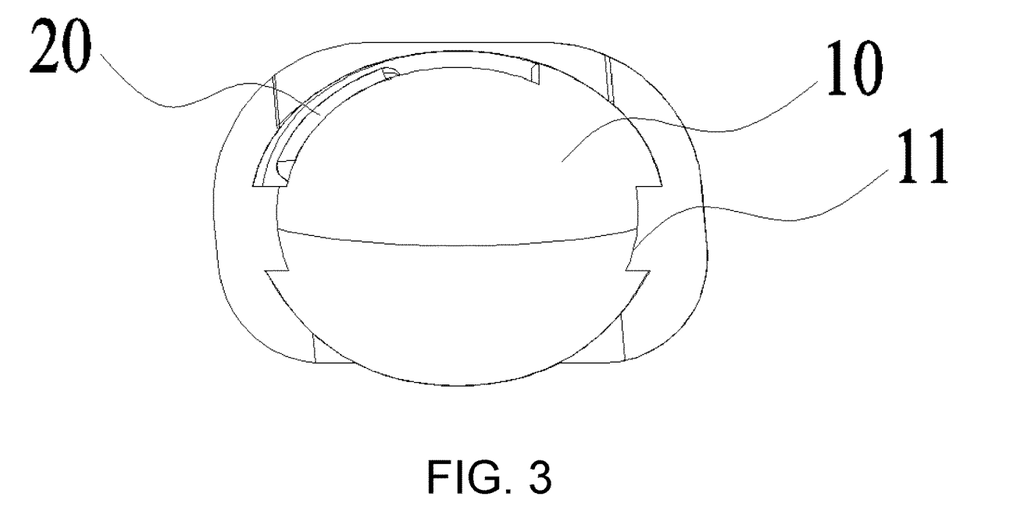
FIG. 3 is a schematic view of the structure of the orthodontic appliance in a second state according to embodiment 1.
Figure 4:
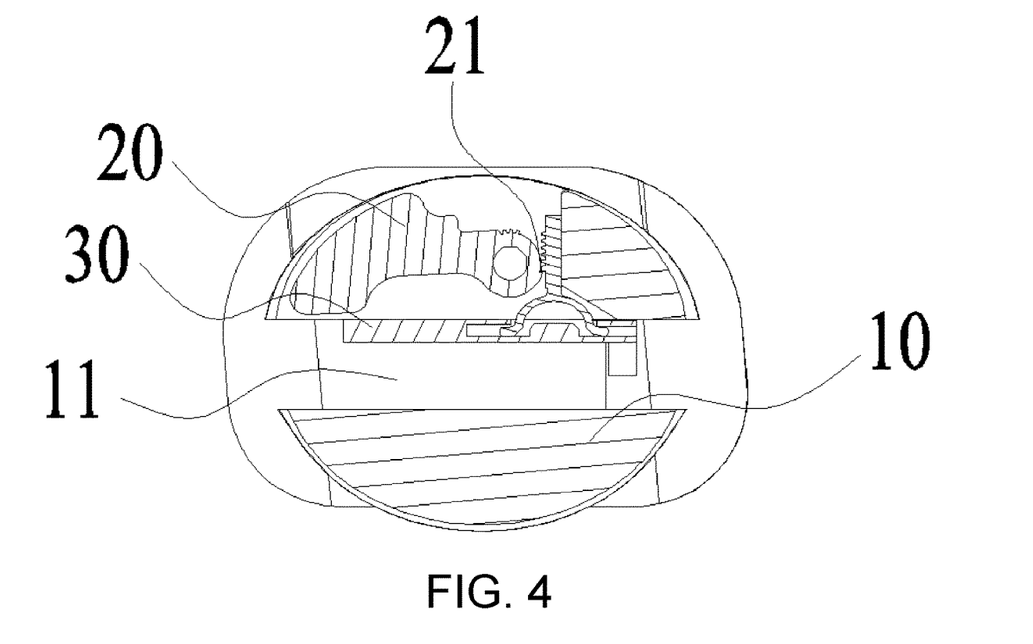
FIG. 4 is a cross-sectional view of the orthodontic appliance in the second state according to embodiment 1.
Figure 5:
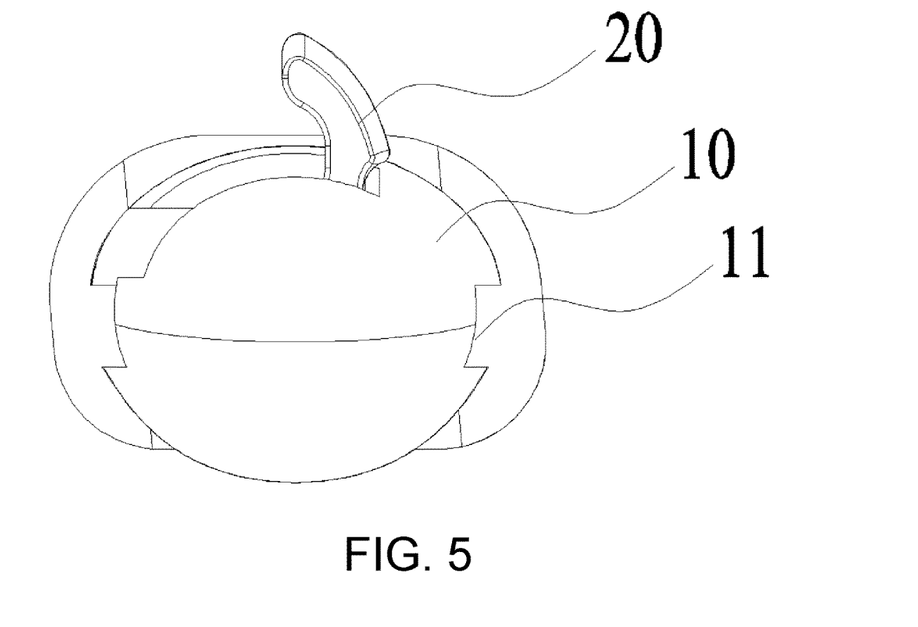
FIG. 5 is a schematic view of a structure of an orthodontic appliance in a first state according to embodiment 2.
Figure 6:
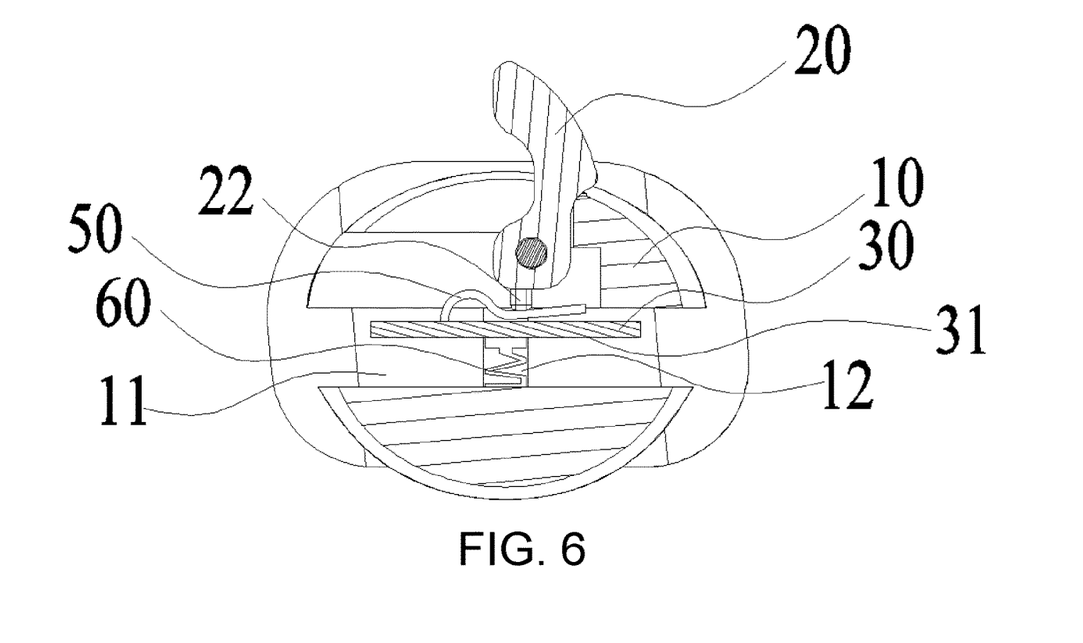
FIG. 6 is a cross-sectional view of the orthodontic appliance in the first state according to embodiment 2.
Figure 7:
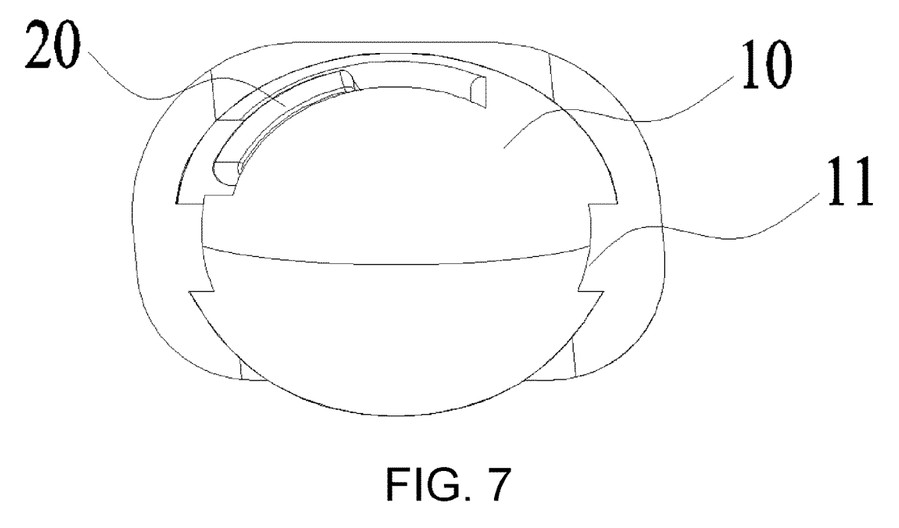
FIG. 7 is a schematic view of the structure of the orthodontic appliance in a second state according to embodiment 2.
Figure 8:
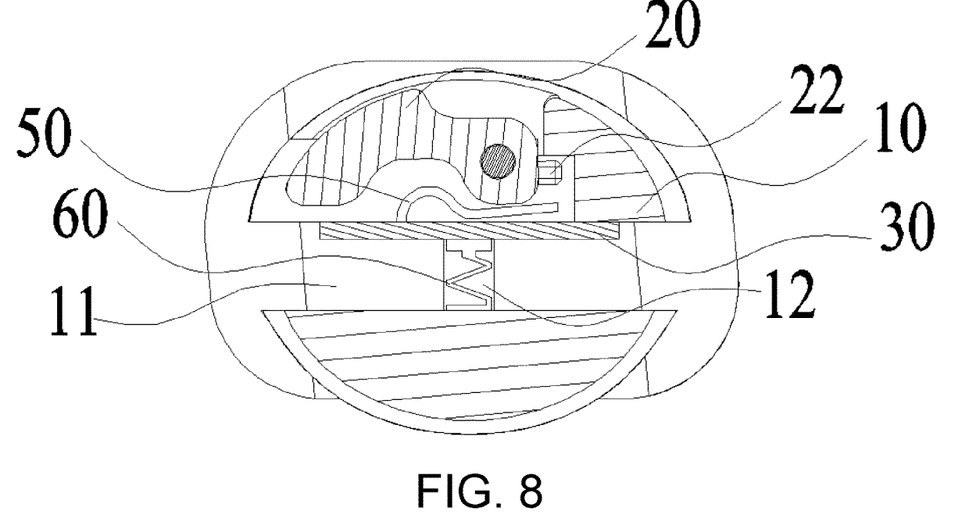
FIG. 8 is a cross-sectional view of the orthodontic appliance in the second state according to embodiment 2.
Figure 9:
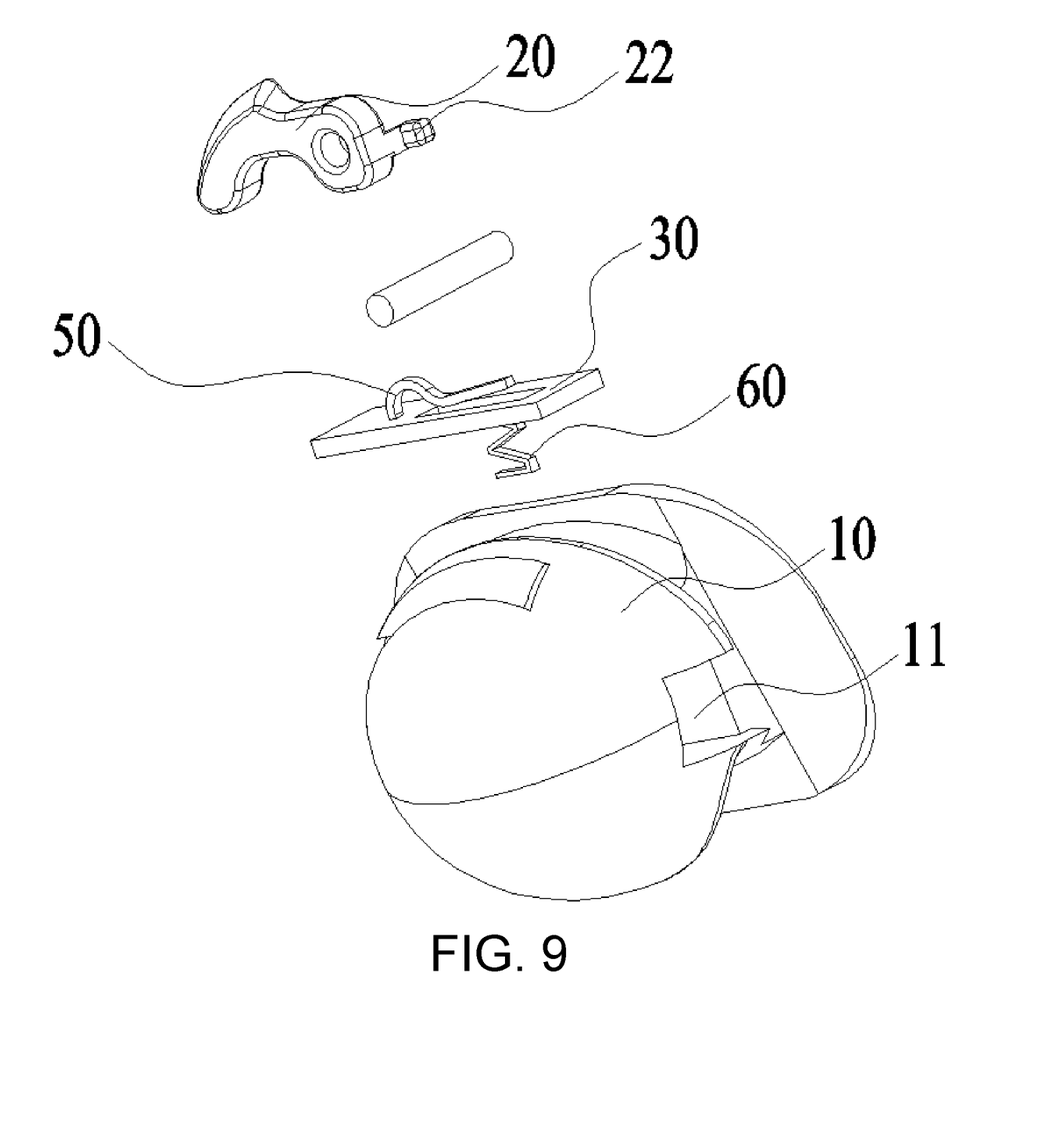
FIG. 9 is an exploded view of the structure of the orthodontic appliance according to embodiment 2.

With reference to FIGS. 5 to 9, FIG. 5 is a schematic view of a structure of an orthodontic appliance in a first state according to embodiment 2. FIG. 6 is a cross-sectional view of the orthodontic appliance in the first state according to embodiment 2. FIG. 7 is a schematic view of the structure of the orthodontic appliance in a second state according to embodiment 2. FIG. 8 is a cross-sectional view of the orthodontic appliance in the second state according to embodiment 2. FIG. 9 is an exploded view of the structure of the orthodontic appliance according to embodiment 2. An orthodontic appliance including the main body 10 is provided in this embodiment, and the arch wire groove 11 is formed on the main body 10. The main body 10 is provided with the movable traction member 20 and the space occupying member 30, and the traction member 20 can move between the available position and the unavailable position. When moving from the unavailable position to the available position, the traction member 20 drives the space occupying member 30 to move to enter the arch wire groove 11. The traction member 20 can move, and the specific movement mode of the traction member may be movement, rotation, or a combination of movement and rotation. When needed, the traction member 20 may be moved to the available position, and the space occupying member 30 may be driven to enter the arch wire groove 11 to press against the arch wire. A protrusion 22 is provided on the traction member 20, and when the traction member 20 moves from the unavailable position to the available position, the protrusion 20 pushes the transmission member 50 and then pushes the space occupying member 30 to move. The traction member 20 indirectly drives the space occupying member to move through squeezing the transmission member 50. The transmission member 50 and the space occupying member 30 are fixedly connected, and the transmission member 50 is an elastic member, so that the space occupying member 30 can lock different sizes of arch wires.

The orthodontic appliance further includes a reset member 60 connected to the space occupying member 30, and the space occupying member 30 is located outside the arch wire groove 11 when the reset member 60 is in the initial state. When the traction member 20 drives the space occupying member 30 to enter the arch wire groove 11, the reset member 60 is squeezed and deformed. When the traction member 20 is moved to the unavailable position, the protrusion 22 is no longer in contact with the transmission member 50. When the reset member 60 is restored to its original shape, the space occupying member 30 is driven to automatically move out of the arch wire groove 11.

A bottom portion of the arch wire groove 11 is provided with a groove 12, and the reset member 60 is provided in the groove 12. Further, an upper surface of the reset member 60 is flush with the bottom portion of the arch wire groove 11, and placement of the arch wire into the arch wire groove 11 is thus not affected. When the reset member 60 enables the traction member 20 to move to the unavailable position, the space occupying member 30 can automatically exit the arch wire groove 11.

The space occupying member 30 has a locking wall 31, and the locking wall 31 is parallel to a side wall of the arch wire groove 11. The space occupying member 30 presses against the arch wire through the locking wall 31 to achieve locking of the arch wire.

Embodiment 3

Figure 10:
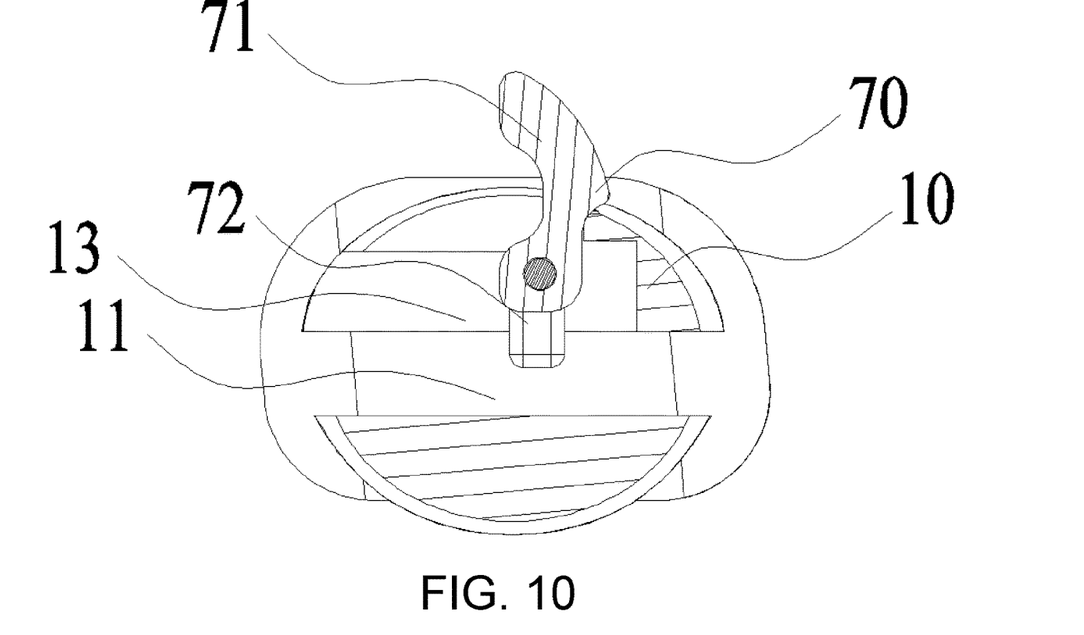
FIG. 10 is a cross-sectional view of an orthodontic appliance in a first state according to embodiment 3.
Figure 11:
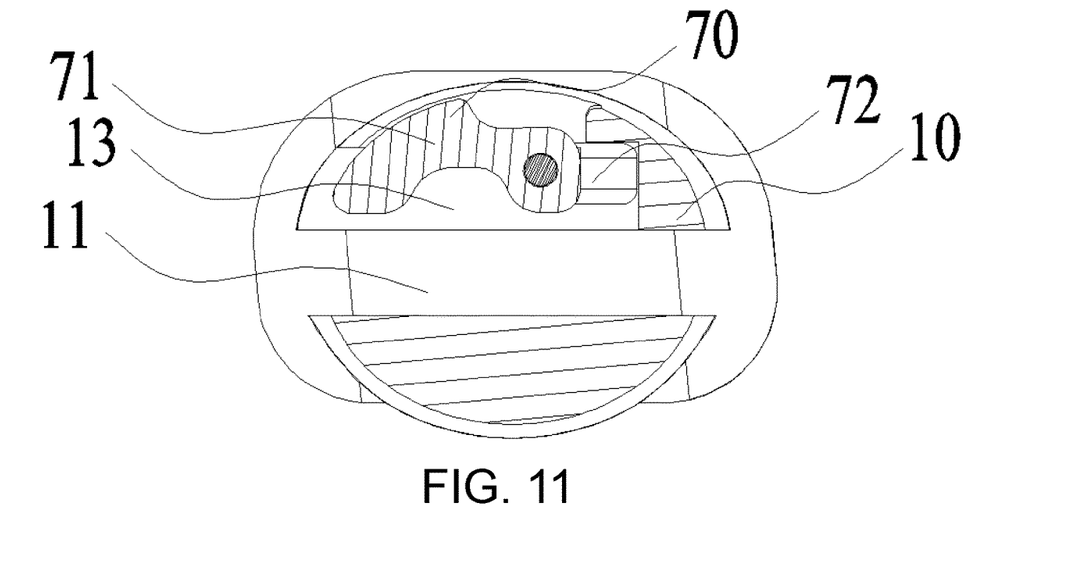
FIG. 11 is a cross-sectional view of the orthodontic appliance in a second state according to embodiment 3.

With reference to FIGS. 10 to 11, FIG. 10 is a cross-sectional view of an orthodontic appliance in a first state according to embodiment 3. FIG. 11 is a cross-sectional view of the orthodontic appliance in a second state according to embodiment 3. An orthodontic appliance including the main body 10 is provided in this embodiment, and the arch wire groove 11 is formed on the main body 10. The main body 10 is provided with a movable accessory 70. The accessory 70 includes a traction portion 71 and a space occupying portion 72, and the accessory 70 is able to move between an available position and an unavailable position. During the movement of the accessory 70 from the unavailable position to the available position, the traction portion 71 is available for traction, and the space occupying portion 72 moves to enter the arch wire groove 11. During the movement of the accessory 70 from the unavailable position to the available position, the space occupying portion 72 moves out of the arch wire groove 11. The space occupying portion 72 is a protrusion. The main body 10 is provided with an accommodating space 13. When the accessory 70 is in the unavailable position, part or whole of the accessory 70 is accommodated in the accommodating space 13. The accommodating space 13 communicates with the arch wire groove 11, and the space occupying portion 72 can enter or exit the arch wire groove 11 from the connection therebetween.

Embodiment 4

Figure 12:
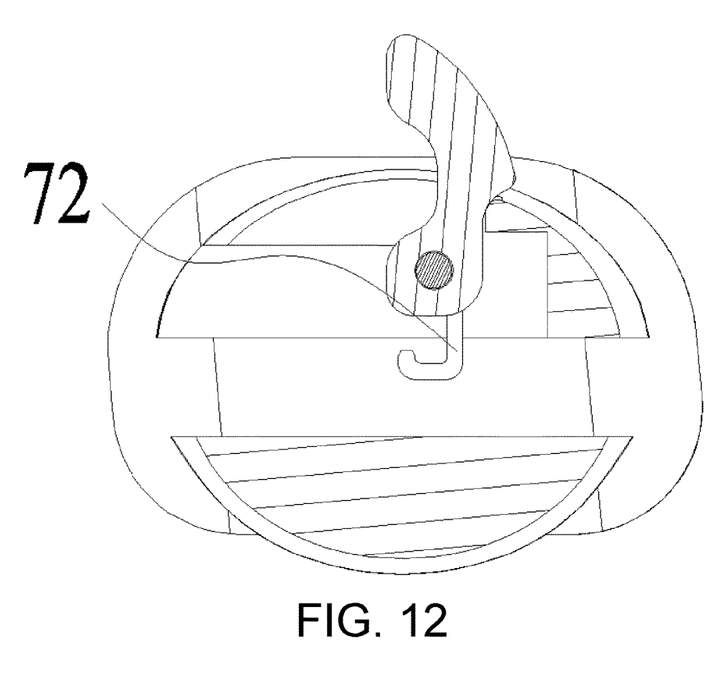
FIG. 12 is a cross-sectional view of an orthodontic appliance according to embodiment 4.
Figure 13:
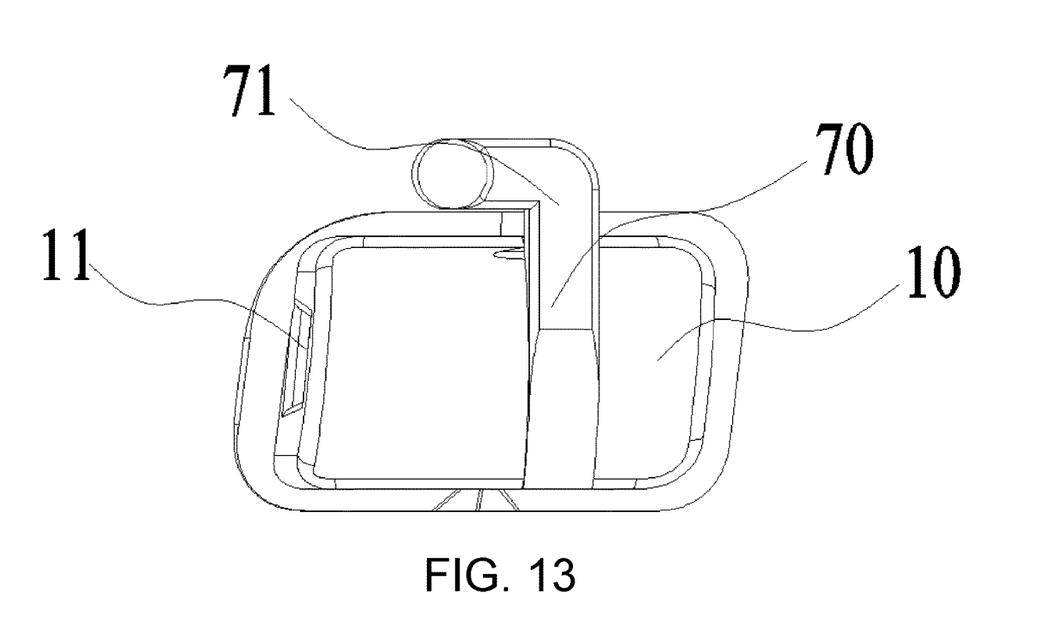
FIG. 13 is a front view of an orthodontic appliance according to embodiment 5.

With reference to FIG. 12, this embodiment provides an orthodontic appliance that is basically the same as that provided in embodiment 3, and the difference therebetween is that: the space occupying portion 72 is an elastic portion, so that the space occupying portion 72 is able to press against different sizes of arch wires.

Embodiment 5

Figure 14:
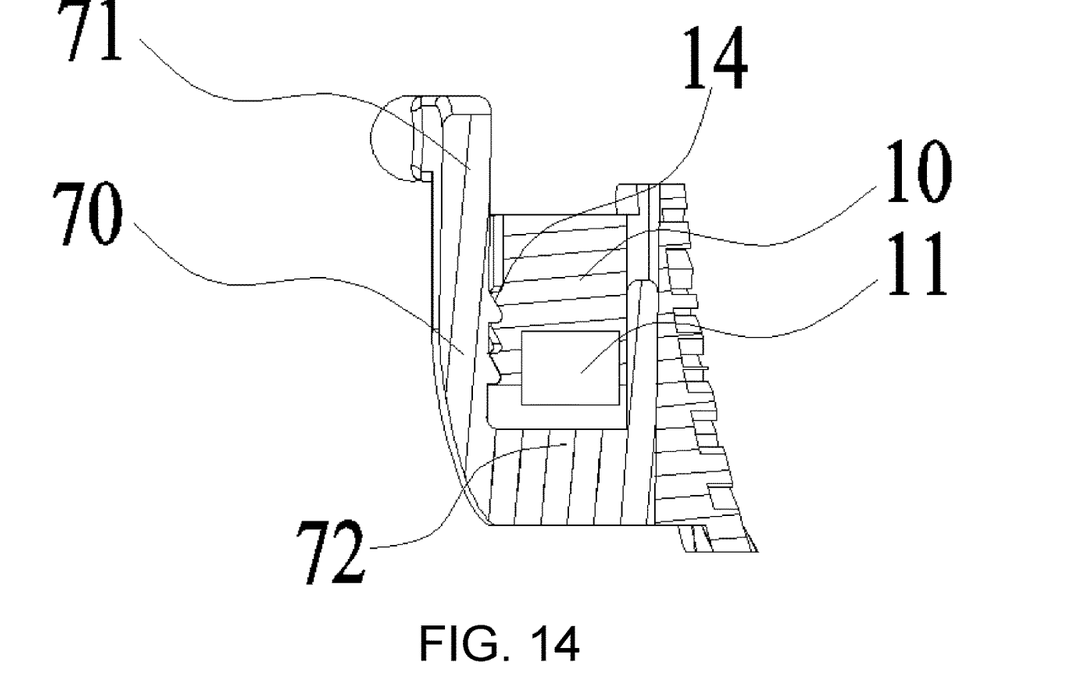
FIG. 14 is a cross-sectional view of a first gear position of the orthodontic appliance according to embodiment 5.
Figure 15:
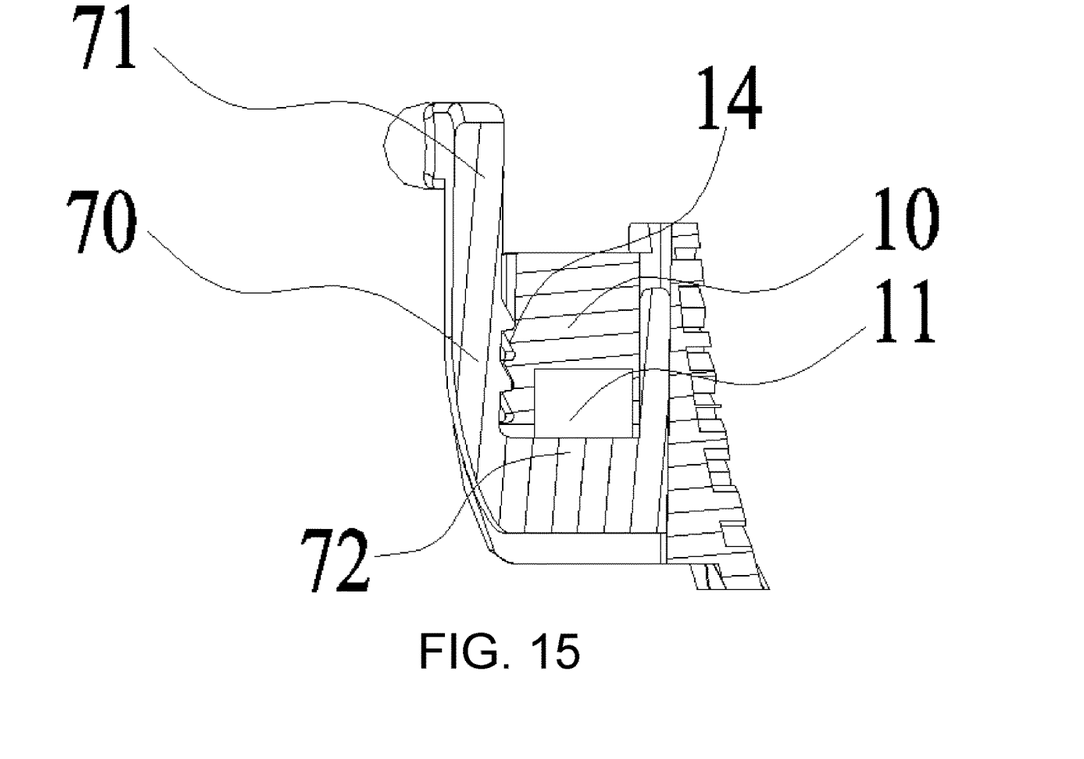
FIG. 15 is a cross-sectional view of a second gear position of the orthodontic appliance according to embodiment 5.
Figure 16:
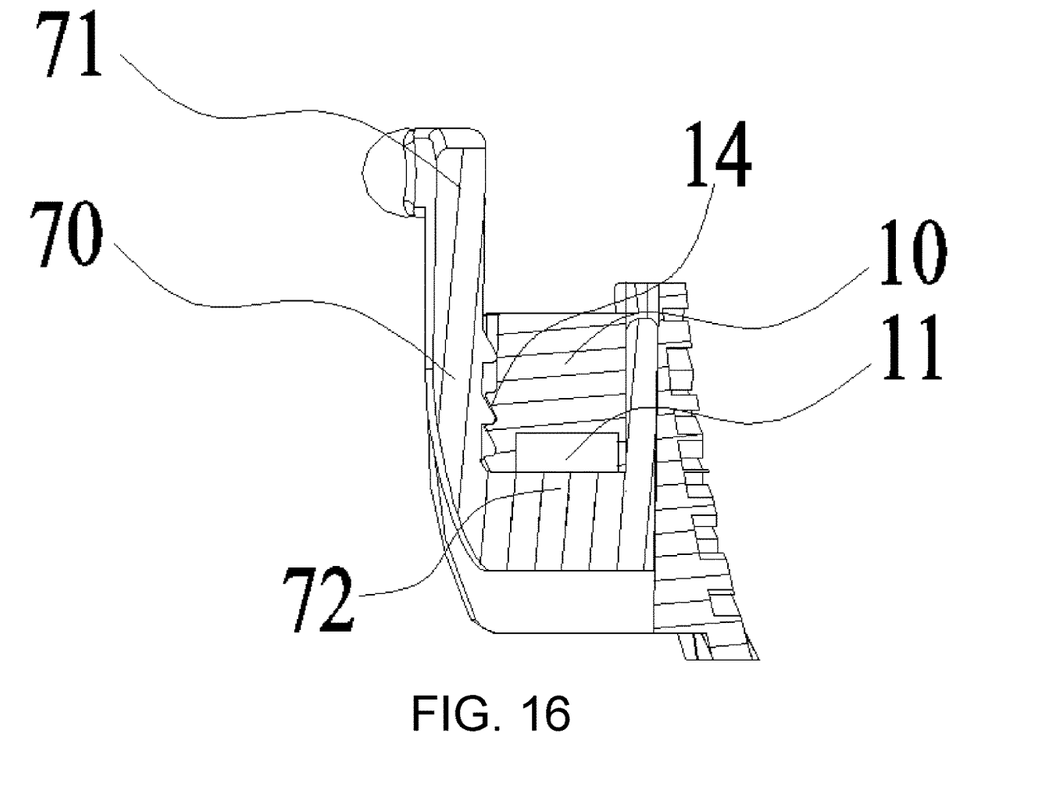
FIG. 16 is a cross-sectional view of a third gear position of the orthodontic appliance according to embodiment 5.
Figure 17:
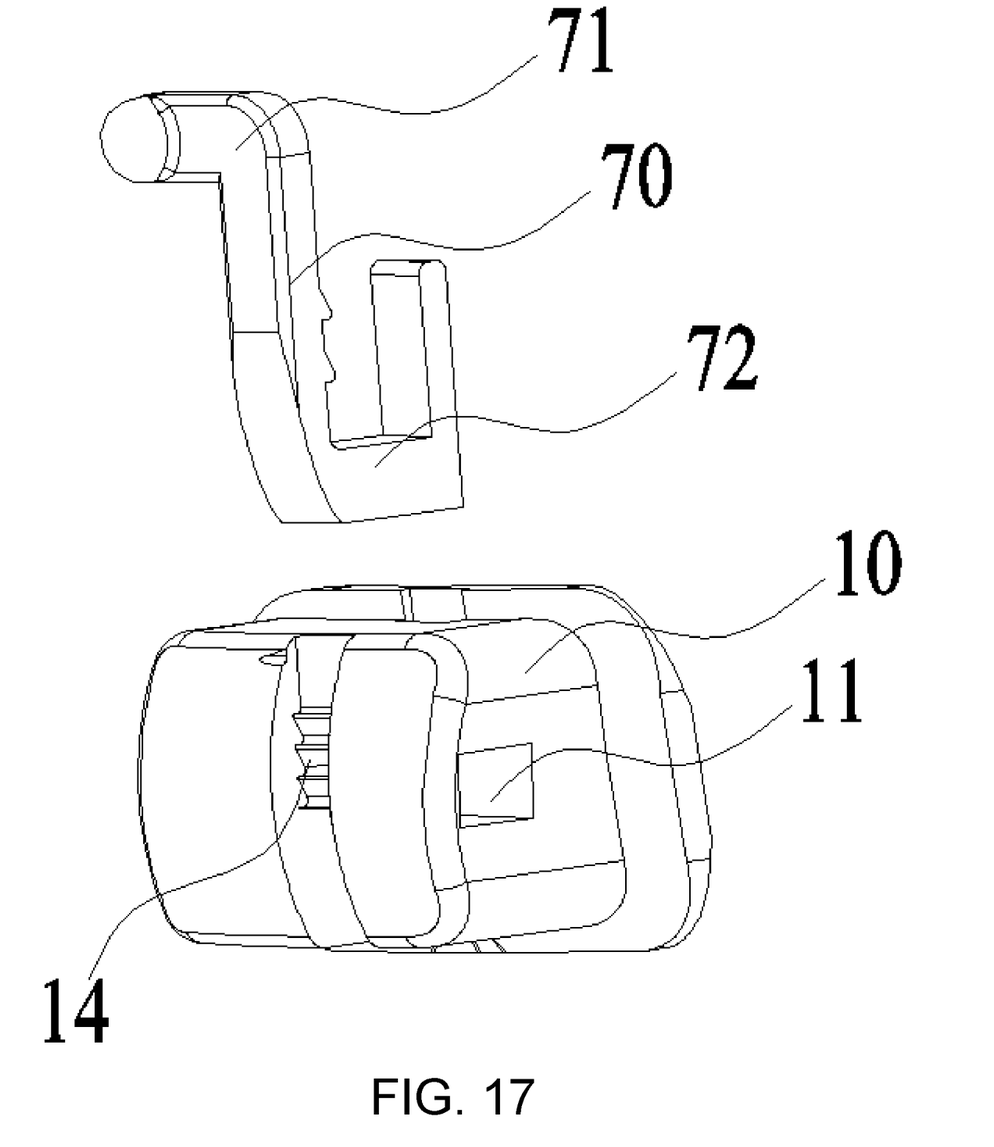
FIG. 17 is an exploded view of a structure of the orthodontic appliance according to embodiment 5.

With reference to FIG. 13 to FIG. 17, FIG. 13 is a front view of an orthodontic appliance according to embodiment 5. FIG. 14 is a cross-sectional view of a first gear position of the orthodontic appliance according to embodiment 5. FIG. 15 is a cross-sectional view of a second gear position of the orthodontic appliance according to embodiment 5. FIG. 16 is a cross-sectional view of a third gear position of the orthodontic appliance according to embodiment 5. FIG. 17 is an exploded view of a structure of the orthodontic appliance according to embodiment 5. An orthodontic appliance including the main body 10 is provided in this embodiment, and the arch wire groove 11 is formed on the main body 10. The main body 10 is provided with the movable accessory 70, the accessory 70 includes the traction portion 71 and the space occupying portion 72, and the traction portion 71 is able to move between the available position and the unavailable position. When the traction portion 71 is in the available position, the traction portion 71 is available for traction. When the traction portion 71 is in the unavailable position, the traction portion 71 is unavailable for traction. When the traction portion 71 is moved from the unavailable position to the available position, the space occupying portion 72 enters the arch wire groove 11. In this embodiment, the traction portion 71 and the space occupying portion 72 are integrally formed. When the traction portion 71 is moved from the available position to the unavailable position, the space occupying portion 72 enters the arch wire groove 11.

A connection between the main body 10 and the accessory 70 comprises a plurality of gear positions 14 between which the accessory 70 can be switched. When the accessory 70 is located in a first gear position, the traction portion 71 is unavailable for traction, and the space occupying portion 72 is located outside the arch wire groove 11. When the accessory 70 is located in a second gear position, the traction portion 71 is available for traction, and the space occupying portion 72 partially enters the arch wire groove 11. When the accessory 70 is located in a third gear position, the traction portion 71 is available for traction, and a larger portion of the space occupying portion 72 enters the arch wire groove.

Embodiment 6

Figure 18:
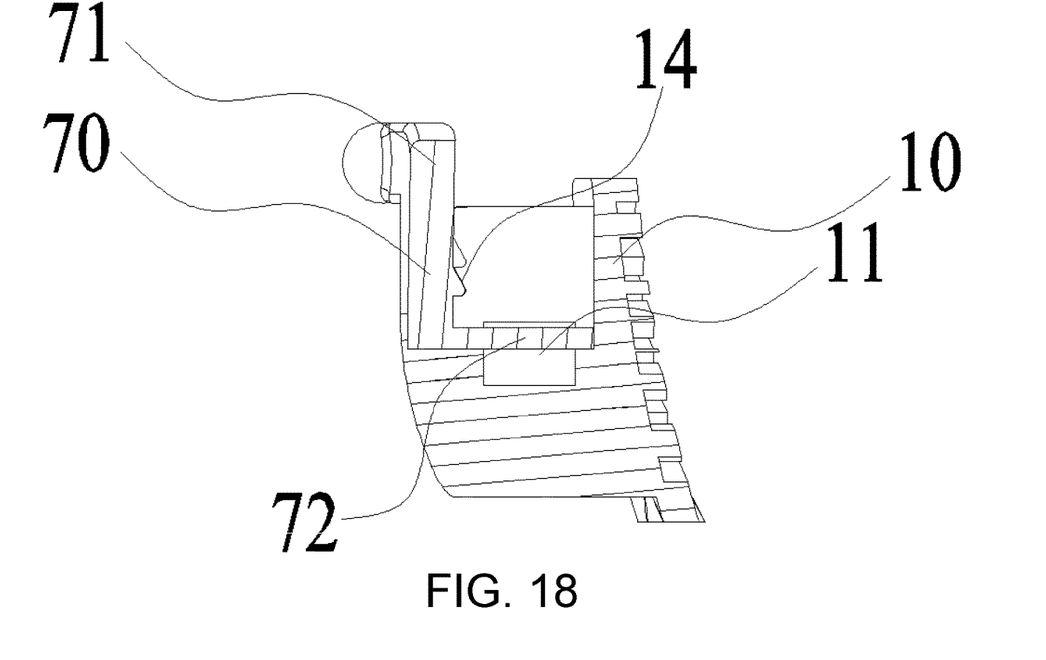
FIG. 18 is a cross-sectional view of an orthodontic appliance having a first gear position according to embodiment 6.
Figure 19:
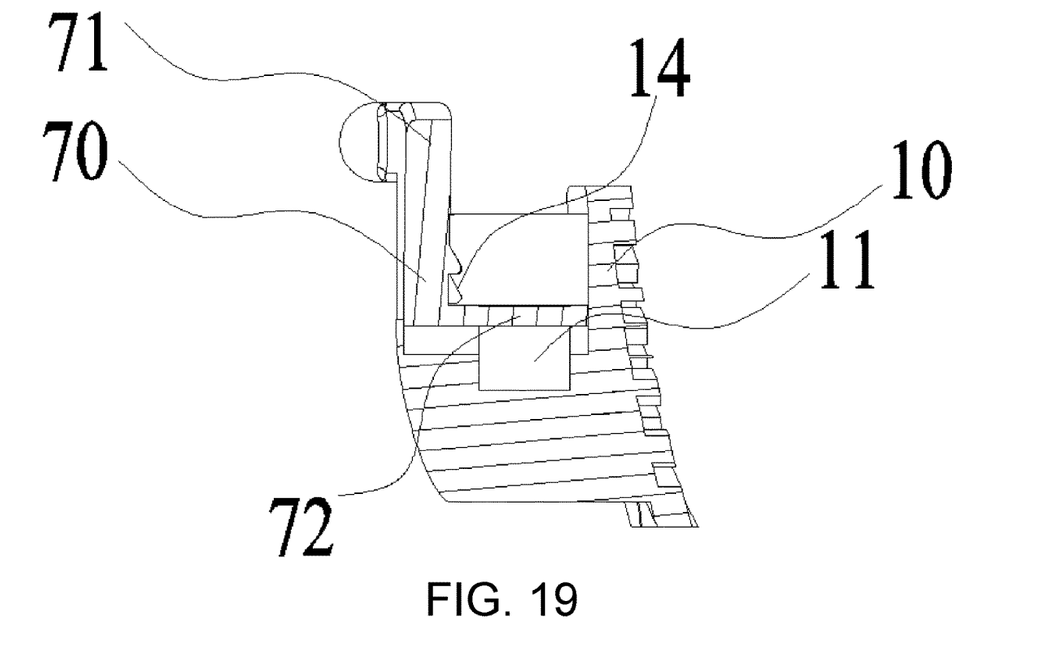
FIG. 19 is a cross-sectional view of the orthodontic appliance having a second gear position according to embodiment 6.

With reference to FIGS. 18 to 19, FIG. 18 is a cross-sectional view of an orthodontic appliance having a first gear position according to embodiment 6. FIG. 19 is a cross-sectional view of the orthodontic appliance having a second gear position according to embodiment 6. An orthodontic appliance including the main body 10 is provided in this embodiment, and the arch wire groove 11 is formed on the main body 10. The main body 10 is provided with the movable accessory 70 which includes the traction portion 71 and the space occupying portion 72, and the traction portion 71 is able to move between the available position and the unavailable position. When the accessory 70 is located in a first gear position and when the traction portion 71 is in the unavailable position, the traction portion 71 is not available for traction, and the space occupying portion 72 occupies part of the volume of the arch wire groove 11. When the accessory 70 is switched to the second gear position, the traction portion 71 is located in the available position, is available for traction, and may be used to hang a traction tool such as a rubber band. The space occupying portion 72 moves out of the arch wire groove 11 and no longer occupies the volume of the arch wire groove 11. When the traction portion 71 is moved from the unavailable position to the available position, the space occupying portion 72 moves out of the arch wire groove 11. The traction portion 71 and the space occupying portion 72 are integrally formed. When the traction portion 71 is moved from the unavailable position to the available position, the space occupying portion 72 enters the arch wire groove 11.

The disclosure is not limited to the above-mentioned embodiments. If the various modifications or variants of the disclosure do not depart from the spirit and scope of the disclosure and if these modifications and variants belong to the claims and equivalent technical scope of the disclosure, the disclosure is also intended to include these modifications and variants.

What is claimed is:

1. An orthodontic appliance comprising:
a main body on which an arch wire groove is formed;
a movable accessory, wherein the main body is provided with the movable accessory, the movable accessory comprises:
   a traction portion, wherein the traction portion is able to move between an available position and an unavailable position, the traction portion is available for traction when the traction portion is in the available position, the traction portion is unavailable for traction when the traction portion is in the unavailable position; and
   a space occupying portion connected to the traction portion, wherein the traction portion is able to drive the space occupying portion to enter the arch wire groove when the traction portion moves from the unavailable position to the available position,
wherein the traction portion and the space occupying portion are parts of the movable accessory and are integrated,
wherein the space occupying portion is an elastic portion, and the space occupying portion is configured to press against different sizes of arch wires, the space occupying portion and the elastic portion are a single element, and the elastic portion is configured to directly contact the arch wire.

2. The orthodontic appliance according to claim 1, wherein the traction portion is able to drive the space occupying portion to move out of the arch wire groove when the traction portion moves from the available position to the unavailable position.

3. The orthodontic appliance according to claim 1, wherein the movable accessory moves between a plurality of positions relative to the main body, when the movable accessory is located in a first position of the positions, the space occupying portion is located outside the arch wire groove, when the accessory is located in a second position of the positions, the space occupying portion partially enters the arch wire groove, and when the accessory is located in a third position of the positions, a larger portion of the space occupying portion enters the arch wire groove than when the accessory is in the second position.

4. An orthodontic appliance comprising:
a main body on which an arch wire groove is formed;
a traction member, wherein the main body is provided with the traction member, and the traction member is able to move between an available position and an unavailable position, wherein the traction member is available for traction when the traction member is in the available position, the traction member is unavailable for traction when the traction member is in the unavailable position; and
a space occupying member, wherein the traction member drives the space occupying member to enter the arch wire groove when the traction member moves from the unavailable position to the available position,
wherein the main body, the traction member and the space occupying member are not integrated,
wherein the orthodontic appliance further comprises a transmission member, the traction member is in contact with the transmission member, and the traction member drives the space occupying member to move through the transmission member,
wherein when the traction member is in the available position, the traction member drives the transmission member, when the traction member is in the unavailable position, the traction member does not drive the transmission member.

5. The orthodontic appliance according to claim 4, wherein the traction member drives the space occupying member to move out of the arch wire groove when the traction member moves from the available position to the unavailable position.

6. The orthodontic appliance according to claim 4, wherein the transmission member is an elastic member, and the space occupying member is able to press against different sizes of arch wires.

7. The orthodontic appliance according to claim 4, wherein the traction member is rotatably connected to the main body through a shaft, the traction member has first teeth, the transmission member has second teeth, and the traction member and the transmission member are linked with each other by tooth meshing between the first teeth and the second teeth.

8. The orthodontic appliance according to claim 7, wherein a limiting member is provided on the traction member, and the traction member restricts continuous movement of the transmission member when moving to the unavailable position.

9. The orthodontic appliance according to claim 4, wherein a protrusion is provided on the traction member, and the protrusion pushes the transmission member and then pushes the space occupying member to move when the traction member moves from the unavailable position to the available position.

10. The orthodontic appliance according to claim 4, wherein the orthodontic appliance further comprises a reset member connected to the space occupying member, and the space occupying member is located outside the arch wire groove when the reset member is in an initial state.

11. The orthodontic appliance according to claim 10, wherein a bottom portion of the arch wire groove is provided with a groove, and the reset member is provided in the groove.

* * * * *